(12) United States Patent
Jonas

(10) Patent No.: US 8,452,787 B2
(45) Date of Patent: May 28, 2013

(54) REAL TIME DATA WAREHOUSING

(75) Inventor: Jeffrey James Jonas, Las Vegas, NV (US)

(73) Assignee: International Business Machines Corporation, Armonk, NY (US)

(*) Notice: Subject to any disclaimer, the term of this patent is extended or adjusted under 35 U.S.C. 154(b) by 1909 days.

(21) Appl. No.: 10/331,068

(22) Filed: Dec. 27, 2002

(65) Prior Publication Data
US 2003/0154194 A1    Aug. 14, 2003

Related U.S. Application Data

(60) Provisional application No. 60/344,067, filed on Dec. 28, 2001.

(51) Int. Cl.
*G06F 17/30*    (2006.01)

(52) U.S. Cl.
USPC .......................................................... 707/758

(58) Field of Classification Search
USPC .................. 707/100, 3, 10, 200, 102, 758
See application file for complete search history.

(56) References Cited

U.S. PATENT DOCUMENTS

| | | |
|---|---|---|
| 1,261,167 A | 4/1918 | Russell |
| 3,659,085 A | 4/1972 | Porter |
| 4,232,313 A | 11/1980 | Fleishman |
| 4,981,370 A | 1/1991 | Dziewit et al. |
| 5,010,478 A | 4/1991 | Deran |
| 5,229,764 A | 7/1993 | Matchett et al. |
| 5,403,639 A | 4/1995 | Belsan et al. |
| 5,454,101 A | 9/1995 | Mackay et al. |
| 5,534,855 A | 7/1996 | Shockley et al. |
| 5,555,409 A | 9/1996 | Leenstra et al. |
| 5,560,006 A | 9/1996 | Layden et al. |
| 5,608,907 A | 3/1997 | Fehskens et al. |
| 5,659,731 A | 8/1997 | Gustafson |

(Continued)

FOREIGN PATENT DOCUMENTS

| | | |
|---|---|---|
| JP | 63-282838 | 11/1988 |
| JP | 02-12563 | 1/1990 |

(Continued)

OTHER PUBLICATIONS

Written Opinion for International Application No. PCT/US02/41630 dated Jan. 19, 2005.

(Continued)

*Primary Examiner* — Sheree Brown
(74) *Attorney, Agent, or Firm* — Gates & Cooper LLP

(57) ABSTRACT

A method and system for processing data into and in a database and for retrieving the processed data is disclosed. The data comprises identifiers of a plurality of entities. The method and system comprises: (a) processing data into and in a database, (b) enhancing received data prior to storage in a database, (c) determining and matching records based upon relationships between the records in the received data and existing data without any loss of data, (d) enabling alerts based upon user-defined alert rules and relationships, (e) automatically stopping additional matches and separating previously matched records when identifiers used to match records are later determined to be common across entities and not generally distinctive of an entity, (f) receiving data queries for retrieving the processed data stored in the database, (g) utilizing the same algorithm to process the queries and (h) transferring the processed data to another database that uses the same algorithm.

12 Claims, 7 Drawing Sheets

U.S. PATENT DOCUMENTS

| | | | |
|---|---|---|---|
| 5,675,785 | A | 10/1997 | Hall et al. |
| 5,758,343 | A | 5/1998 | Vigil et al. |
| 5,764,977 | A | 6/1998 | Oulid-Aissa et al. |
| 5,778,375 | A | 7/1998 | Hecht |
| 5,781,911 | A | 7/1998 | Young et al. |
| 5,784,464 | A | 7/1998 | Akiyama et al. |
| 5,794,246 | A | 8/1998 | Sankaran et al. |
| 5,799,309 | A | 8/1998 | Srinivasan |
| 5,819,263 | A | 10/1998 | Bromley et al. |
| 5,848,373 | A | 12/1998 | Delorme et al. |
| 5,878,416 | A | 3/1999 | Harris et al. |
| 5,892,828 | A | 4/1999 | Perlman |
| 5,933,831 | A | 8/1999 | Jorgensen |
| 5,991,408 | A | 11/1999 | Pearson et al. |
| 5,991,733 | A | 11/1999 | Aleia et al. |
| 5,991,758 | A | 11/1999 | Ellard |
| 5,991,765 | A | 11/1999 | Vethe |
| 5,995,097 | A | 11/1999 | Tokumine et al. |
| 5,995,973 | A | 11/1999 | Daudenarde |
| 6,014,670 | A | 1/2000 | Zamanian et al. |
| 6,032,158 | A | 2/2000 | Mukhopadhyay et al. |
| 6,035,295 | A | 3/2000 | Klein |
| 6,035,300 | A | 3/2000 | Cason et al. |
| 6,035,306 | A | 3/2000 | Lowenthal et al. |
| 6,041,410 | A | 3/2000 | Hsu et al. |
| 6,044,378 | A | 3/2000 | Gladney |
| 6,049,805 | A | 4/2000 | Drucker et al. |
| 6,052,693 | A | 4/2000 | Smith et al. |
| 6,058,477 | A | 5/2000 | Kusakabe et al. |
| 6,065,001 | A | 5/2000 | Ohkubo et al. |
| 6,073,140 | A | 6/2000 | Morgan et al. |
| 6,076,167 | A | 6/2000 | Borza |
| 6,092,199 | A | 7/2000 | Dutcher et al. |
| 6,122,641 | A | 9/2000 | Williamson et al. |
| 6,122,757 | A | 9/2000 | Kelley |
| 6,160,903 | A | 12/2000 | Hamid et al. |
| 6,167,517 | A | 12/2000 | Gilchrist et al. |
| 6,185,557 | B1 | 2/2001 | Liu |
| 6,202,151 | B1 | 3/2001 | Musgrave et al. |
| 6,208,990 | B1 | 3/2001 | Suresh et al. |
| 6,263,446 | B1 | 7/2001 | Kausik et al. |
| 6,272,495 | B1 | 8/2001 | Hetherington |
| 6,289,334 | B1 | 9/2001 | Reiner et al. |
| 6,317,834 | B1 | 11/2001 | Gennaro et al. |
| 6,334,132 | B1 | 12/2001 | Weeks |
| 6,339,775 | B1 | 1/2002 | Zamanian et al. |
| 6,357,004 | B1 | 3/2002 | Davis |
| 6,385,604 | B1 | 5/2002 | Bakalash et al. |
| 6,418,450 | B2 | 7/2002 | Daudenarde |
| 6,446,210 | B1 | 9/2002 | Borza |
| 6,460,037 | B1 | 10/2002 | Weiss et al. |
| 6,523,041 | B1 * | 2/2003 | Morgan et al. ............ 707/102 |
| 6,684,334 | B1 | 1/2004 | Abraham |
| 6,697,947 | B1 | 2/2004 | Matyas, Jr. et al. |
| 6,734,783 | B1 | 5/2004 | Anbai |
| 6,743,022 | B1 | 6/2004 | Sarel |
| 6,757,689 | B2 | 6/2004 | Battas et al. |
| 6,819,797 | B1 | 11/2004 | Smith |
| 6,886,747 | B2 | 5/2005 | Snapp |
| 6,931,392 | B1 | 8/2005 | Skeen |
| 6,954,757 | B2 | 10/2005 | Zargham et al. |
| 6,968,338 | B1 | 11/2005 | Gawdiak et al. |
| 7,003,560 | B1 | 2/2006 | Mullen et al. |
| 7,092,951 | B1 | 8/2006 | Luo et al. |
| 7,240,027 | B2 | 7/2007 | McConnell et al. |
| 2001/0049690 | A1 | 12/2001 | McConnell et al. |
| 2002/0023088 | A1 | 2/2002 | Thwaites |
| 2002/0038308 | A1 | 3/2002 | Cappi |
| 2002/0107864 | A1 | 8/2002 | Battas et al. |
| 2002/0107957 | A1 | 8/2002 | Zargham et al. |
| 2002/0165903 | A1 | 11/2002 | Zargham et al. |
| 2002/0184509 | A1 | 12/2002 | Scheidt et al. |
| 2003/0030733 | A1 | 2/2003 | Seaman et al. |
| 2003/0097380 | A1 * | 5/2003 | Mulhern et al. ............ 707/200 |
| 2003/0182018 | A1 | 9/2003 | Snapp |
| 2003/0182568 | A1 | 9/2003 | Snapp et al. |
| 2003/0191739 | A1 | 10/2003 | Charterjee et al. |
| 2004/0007616 | A1 | 1/2004 | Snapp |
| 2004/0049682 | A1 | 3/2004 | Wilson et al. |
| 2004/0128274 | A1 | 7/2004 | Snapp et al. |
| 2004/0162802 | A1 | 8/2004 | Jonas |
| 2004/0210763 | A1 | 10/2004 | Jonas |
| 2005/0060556 | A1 | 3/2005 | Jonas |
| 2005/0066182 | A1 | 3/2005 | Jonas |
| 2006/0010119 | A1 | 1/2006 | Jonas |

FOREIGN PATENT DOCUMENTS

| | | |
|---|---|---|
| JP | 03-017792 | 1/1991 |
| JP | 04-237373 | 8/1992 |
| JP | 05-127959 | 5/1993 |
| JP | 05-250416 | 9/1993 |
| JP | 10-275158 | 10/1998 |
| JP | 11-184884 | 7/1999 |
| JP | 11296532 | 10/1999 |
| JP | 2000-339351 | 12/2000 |
| JP | 2001-117940 | 4/2001 |
| JP | 2001-325425 | 11/2001 |
| WO | 98/48360 | 10/1998 |
| WO | 98/55947 | 12/1998 |
| WO | 99/64970 | 12/1999 |
| WO | 01/22285 | 3/2001 |
| WO | 01/29780 | 4/2001 |

OTHER PUBLICATIONS

International Search Report from PCT/US03/35607, dated Apr. 24, 2004.

Winkler et al., *The State of Record Linkage and Current Research Problems*.

Winkler et al., Advanced Methods for Record Linkage.

Jaro, "Record Linkage Research and the Calibration of Record Linkage Algorithms", U.S. Bureau of the Census, Report No: rr-84/27 (Aug. 9, 1984).

DeWitt et al., *An Evaluation of Non-Equijoin Algorithms*, Proc. 17$^{th}$ Intl. Conf. on Very Large Data Bases, Sep. 1991, pp. 443-452.

Li et al., *Skew Handling Techniques in Sort-Merge Join*.

Verykios et al., *A Bayesian decision model for cost optimal record matching*, The VLDB Journal, 2000, vol. 12, Nos. 28-450, pp. 28-40.

van den Bercken et al., *The Bulk Index Join: A Generic Approach to Processing Non-Equijoins*.

Monge, *Matching Algorithms within a Duplicate Detection System*.

Yuwono et al., *Search and Ranking Algorithms for Locating Resources on the World Wide Web*, Intl. Conf. on Data Engineering, 1996, pp. 164-171.

Hou et al., *Medical Image Retrieval by Spatial Features*, 1992 IEEE Intl. Conf. on Systems, Man and Cybernetics, Oct. 1992, vol. 1, pp. 1364-1369.

Callan et al.; *Searching Distributed Collections With Inference Networks*, Proc. 18$^{th}$ Annual Intl. ACM SIGIR Conf. on R&D in Information Retrieval, Jul. 9-13, 1995, pp. 21-28.

DeFazio et al., *Integrating IR and RDBMS Using Cooperative Indexing*, Proc. 18$^{th}$ Annual Intl. ACM SIGIR Conf. on R&D in Information Retrieval, Jul. 9-13, 1995, pp. 84-92.

Sclaroff et al., *ImageRover: A Content-Based Image Browser for the World Wide Web*, IEEE Workshop on Content-Based Access of Image and Video Libraries, Jun. 1997, pp. 2-9.

Knoblock, *Searching the World Wide Web*, Trends & Controversies, Jan.-Feb. 1997, pp. 8-24.

Amba et al., *Automatic Linking of Thesauri*, Proc. 18$^{th}$ Annual Intl. ACM SIGIR Conf. on R&D in Information Retrieval, Jul. 9-13, 1995, pp. 181-188.

Gelbart et al., *Toward a Comprehensive Legal Information Retrieval System*, Database and Expert Systems Applns., Proc. Intl. Conf. in Vienna, Austria, 1990, pp. 121-125.

Kimoto et al., *Construction of a Dynamic Thesaurus and Its Use for Associated Information Retrieval*, Proc. 13$^{th}$ Intl. Conf. on R&D in Information Retrieval, Sep. 5-7, 1990, pp. 227-241.

Findler, *Information Retrieval Systems*, an Artificial Intelligence Technique for Information and Fact Retrieval, 1991.

Yearwood et al., *Retrieving cases for treatment advice in nursing using text representation and structured text retrieval*, Artificial Intelligence in Medicine, Jan. 1997, vol. 9, No. 1, pp. 79-98.

Batory et al., *Implementation Concepts for an Extensible Data Model and Data Language*, acm Transactions on Database Systems, Sep. 1988, vol. 13, No. 3, pp. 231-262.
Haisten, *Designing a Data Warehouse*, InfoDB, vol. 9, No. 2, pp. 2-9.
Labio et al., *The WHIPS Prototype for Data Warehouse Creation and Maintenance*, 1997, pp. 557-559.
Haisten, *Information Discovery in the Data Warehouse*, InfoDB, vol. 9, No. 6, pp. 14-25.
Suardi et al., *Execution of Extended Multidatabase SQL*, 1993, pp. 641-650.
Romberg, *Meta-Entities Keeping Pace with Change*, Database Programming & Design, Jan. 1995, pp. 54-59.
Fellegi, *Tutorial on the Fellegi-Sunter Model for Record Linkage*, Section II: Overview of Applications and Introduction to Theory, pp. 127-178.
Crane et al., "Project LINK-LINK: An Interactive Database of Administrative Record Linkage Studies", National Center for Education Statistics and U.S. Department of Agriculture, Record Linkage Techniques—1985: Proceedings of the Workshop on Exact Matching Methodologies, Arlington, VA, pp. 311-315 (May 9-10, 1985).
Childers et al., *The IRS/Census Direct Match Study—Final Report*, Bureau of the Census—Statistical Research Division Report Series, Aug. 1, 1984, pp. 1-22.
LaPlant Jr., *Generalized Data Standardization Program Generator (GENSTAN) Program Generation System Part II*, Bureau of the Census Statistical Research Division Report Series, Jul. 22, 1986.
LaPlant Jr., *User's Guide for the Generalized Record Linkage Program Generator (GENLINK) SRD Program Generator System User's Guide: Part III*, Bureau of the Census Statistical Research Division Report Series, Sep. 1, 1986.
Winkler et al., *An Application of the Fellegi-Sunter Model of Record Linkage to the 1990 U.S. Decennial Census*.
Winkler, *Matching and Record Linkage*.
Scheuren et al., *Recursive Merging and Analysis of Administrative Lists and Data*.
Winkler, *Record Linkage Software and Methods for Merging Administrative Lists*.
Wang et al., *Automatically Detecting Deceptive Criminal Identities*.
Hernandez, *A Generalization of Band Joins and the Merge/Purge Problem*, IEEE Trans. on Knowledge and Data Engineering, 1996.
Lu et al., *Pipelined Band Join in Shared-Nothing Systems*, Proc. 1995 Asian Computing Science Conf., Dec. 1995, pp. 239-253.
Beebe, "Why are Epidemiologists Interested in Matching Algorithms?", National Cancer Institute, Record Linkage Techniques—1985: Proceedings of the Workshop on Exact Matching Methodologies, Arlington, VA, pp. 139-143 (May 9-10, 1985).
Boruch et al., "Exact Matching of Micro Data Sets in Social Research: Benefits and Problems", Record Linkage Techniques—1985: Proceedings of the Workshop on Exact Matching Methodologies, Arlington, VA, pp. 145-153 (May 9-10, 1985).
Scheuren, "Methodologic Issues in Linkage of Multiple Data Bases", National Academy of Sciences, Panel on Statistics for an Aging Population (Sep. 13, 1985), reprinted Record Linkage Techniques—1985: Proceedings of the Workshop on Exact Matching Methodologies, Arlington, VA, pp. 181-187 (May 9-10, 1985).
Winkler, "Processing of Lists and String Comparison", Energy Information Administration, Record Linkage Techniques—1985: Proceedings of the Workshop on Exact Matching Methodologies, Arlington, VA, pp. 181-187 (May 9-10, 1985).
Jaro, "Current Record Linkage Research", U.S. Bureau of the Census, Record Linkage Techniques—1985: Proceedings of the Workshop on Exact Matching Methodologies, Arlington, VA, pp. 317-320 (May 9-10, 1985).
Smith, "Record-Keeping and Data Preparation Practices to Facilitate Record Linkage", Statistics Canada, Record Linkage Techniques—1985: Proceedings of the Workshop on Exact Matching Methodologies, Arlington, VA, pp. 321-326 (May 9-10, 1985).
Hill et al., "Generalized Iterative Record Linkage System", Statistics Canada, Record Linkage Techniques—1985: Proceedings of the Workshop on Exact Matching Methodologies, Arlington, VA, pp. 327-333 (May 9-10, 1985).
Howe et al., "A Generalized Iterative Record Linkage Computer System for Use in Medical Follow-up Studies", Computers and Biomedical Research 14, pp. 327, 240 (1981).
Lee, Joon Ho, "Combining Multiple Evidence from Different Properties of Weighting Schemes", Proceedings of the 18$^{th}$ Annual International ACM SIGIR Conference on Research and Development in Information Retrieval, Seattle, Washington, USA (Jul. 9-13, 1995) pp. 180-188.
Hoshino, "Inter-database relationships discovery and retrieval method for multidatabase environment," Jul. 10, 1998, vol. 98, No. 58, pp. 389-396 (98-DBS-116-77).
International Search Report for PCT/US04/03465 dated Apr. 7, 2005.
Hanming Tu, Pattern Recognition and Geographical Data Standarization, The Proceedings of Geoinformatics '99 Conference, Jun. 19-21, 1999, pp. 1-7.
Matchware Technologies Inc., AUTOSTAN, Generalized Standardization System, User's Manual Version 4.6, Feb. 11, 1998, pp. 1-90.
Vality Technology Incorporated, INTEGRITY, Data Re-enginering Environment, SUPERSTAN User Guide Version 2.5, Mar. 1998.
European Summons to Attend to Oral Proceedings dated Sep. 27, 2011 for EP application No. 02806260.2.
Tatsuo Tsuji, "Basic Knowledge for Database System". Open Design, vol. 7, No. 2, Apr. 1, 2000, pp. 58-81.
English translation of Japanese Office Action dated May 10, 2011 for JP application No. 2003-558673, which translates portions of the Office Action that applies, discusses, or otherwise mention the Tatsuo Tsuji reference identified above.
Rahm et al., "Data Cleaning: Problems and Current Approaches". Quarterly Bulletin of the Computer Society of the IEEE Technical Committee on Data Engineering, Dec. 1, 2000, pp. 1-11.
European Communication dated Jun. 24, 2009 for EP application No. 02806260.2.
Garcia et al., "Immunization Registries DeDuplication and Record Matching". Internet Citation, 1999, pp. 1-11, www.immunizationregistries.com/white_papers/WHP006A_deduplication_recordmatching.pdf.
Whalen et al , "Linking Client Records from Substance Abuse, Mental Health and Medicaid State Agencies". Internet Citation, Jul. 2001, pp. 1-46, www.samhsa.gov/centers/csat/content/idbse/linking pdf.
Sattler et al., "A Data Preparation Framework based on a Multidatabase Language". Database Engineering & Applications, Jul. 16, 2001, pp. 219-228.
Anonymous, "Oracle Warehouse Builder: A Technical Overview". Oracle Technical White Paper, Jan. 1, 2000, pp. 1-21.
European Communication dated Mar. 23, 2009 for EP application No. 02806260.2.
Takezaki et al., "A Method of Database Linkage between Telephone Directory and Residential Map". Institute of Electronics, Information and Communication Engineers, 1987, Part 6, three pages.
Takezaki et al., "A Method of Database Linkage between Telephone Directory and Residential Map". Institute of Electronics, Information and Communication Engineers, 1987, Part 1, four pages.
Susuki et al., "Fragment View—Heterogeneity Resolution Method in Multi-database without Global View". The Institute of Electronics, Information and Communication Engineers, 1997, ten pages.
Munakata, "Federated database systems for managing distributed". Institute of Systems Control and Information Engineers, vol. 40, No. 12, Dec. 15, 1996, pp. 514-521.
Canadian Office Action dated Oct. 7, 2011 for CA application No. 2,471,940.
Japanese Office Action dated Sep. 24, 2009 for JP application No. 2008-237101.
English translation of Japanese Office Action dated Apr. 14, 2009 for JP application No. 2003-558673.
Japanese Office Action dated Jul. 8, 2008 for JP application No. 2003-558673.
Japanese Office Action dated Dec. 16, 2008 for JP application No. 2003-558673.
International Search Report for PCT/US03/41662 dated May 28, 2004.

International Search Report for PCT/US04/09035 dated Nov. 4, 2004.

* cited by examiner

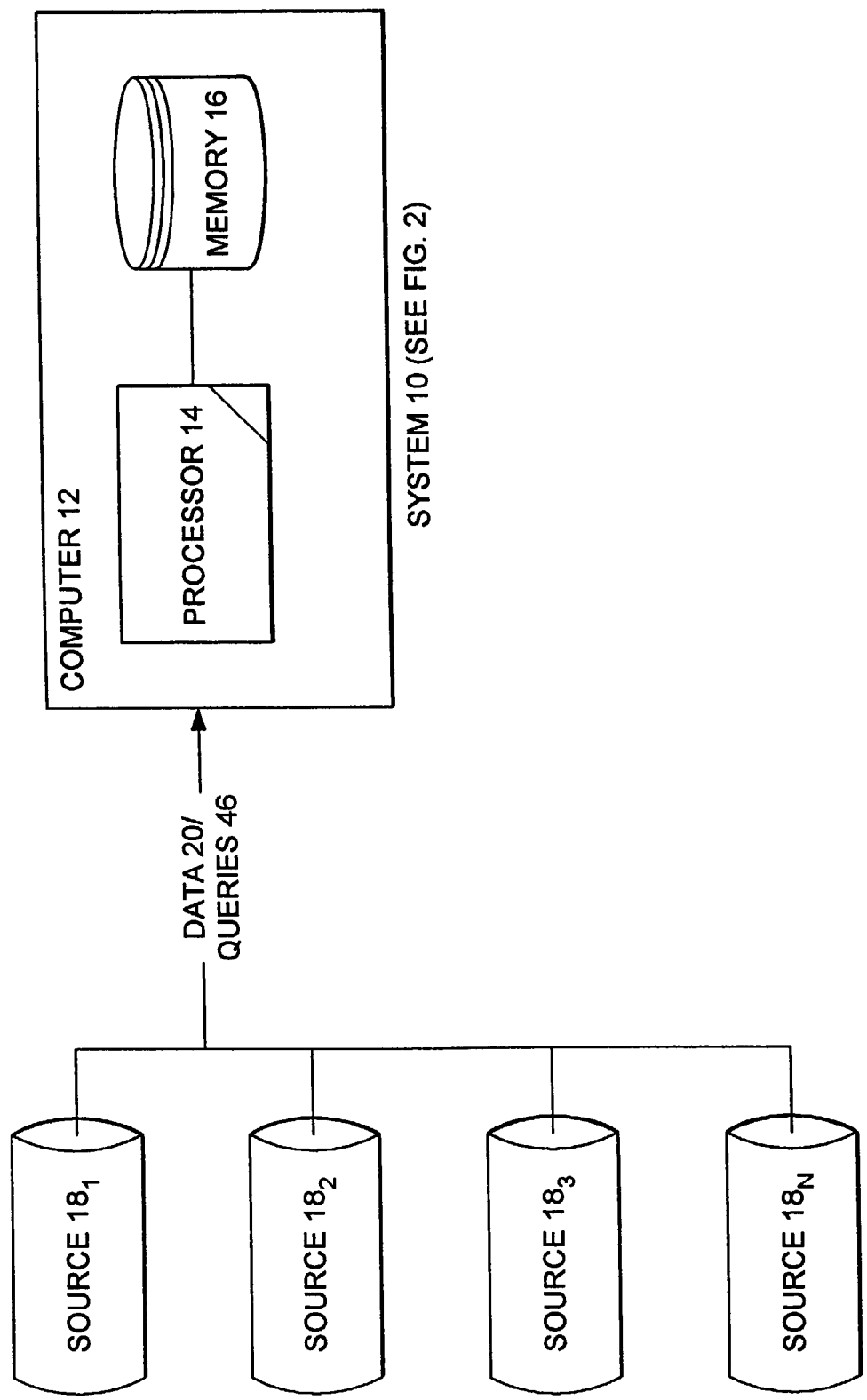

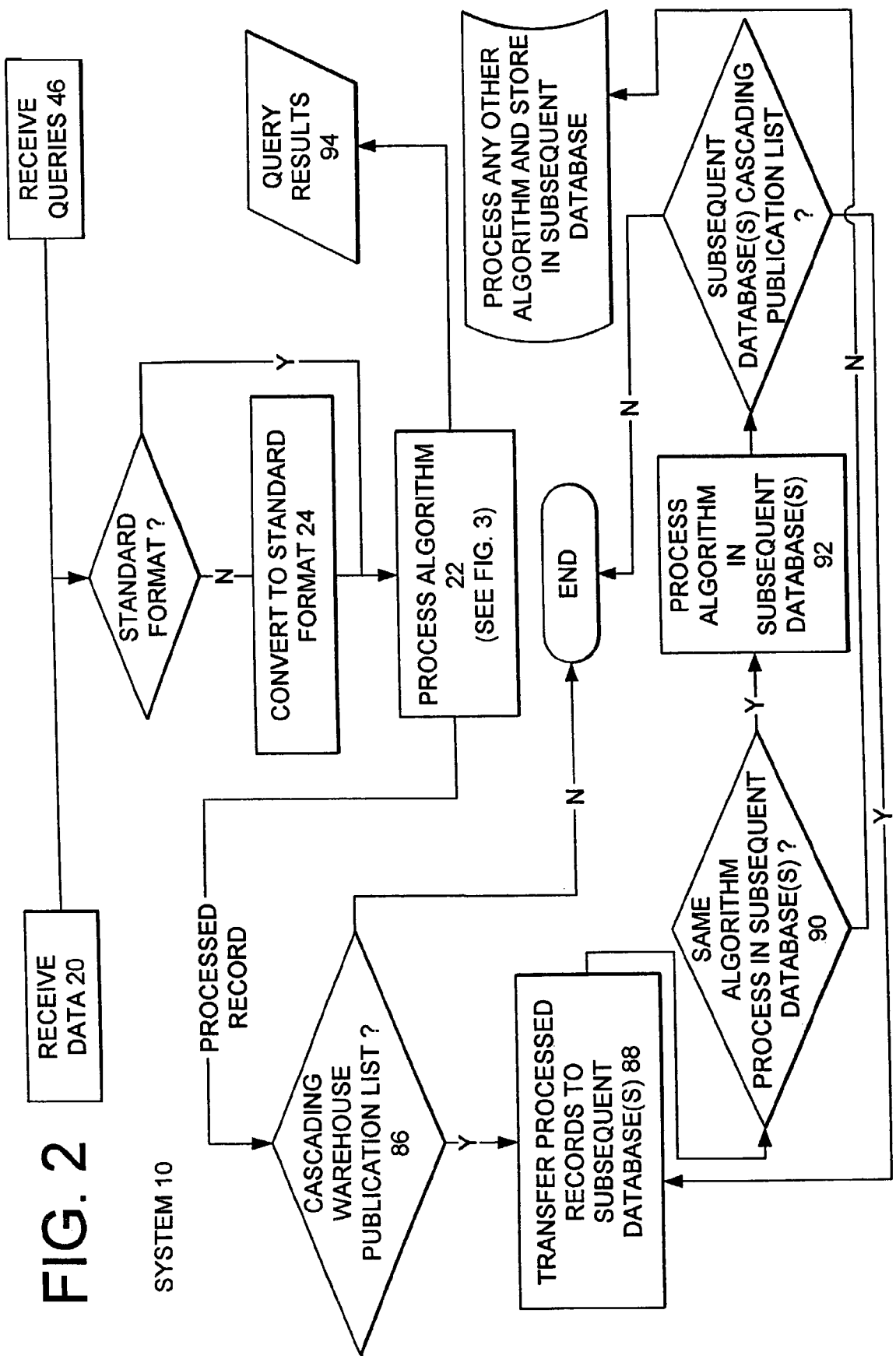

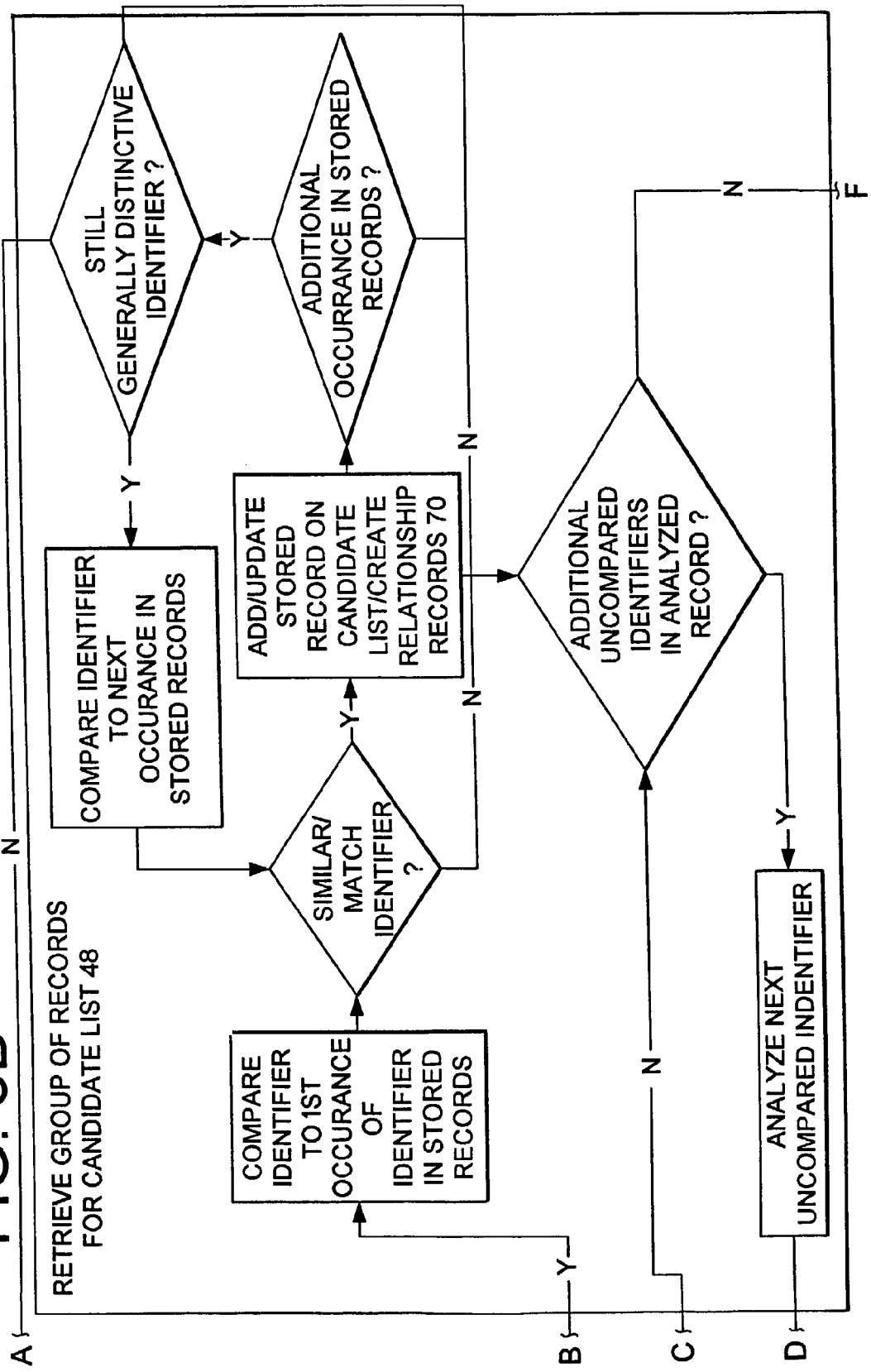
FIG. 3B  PROCESS ALGORITHM 22

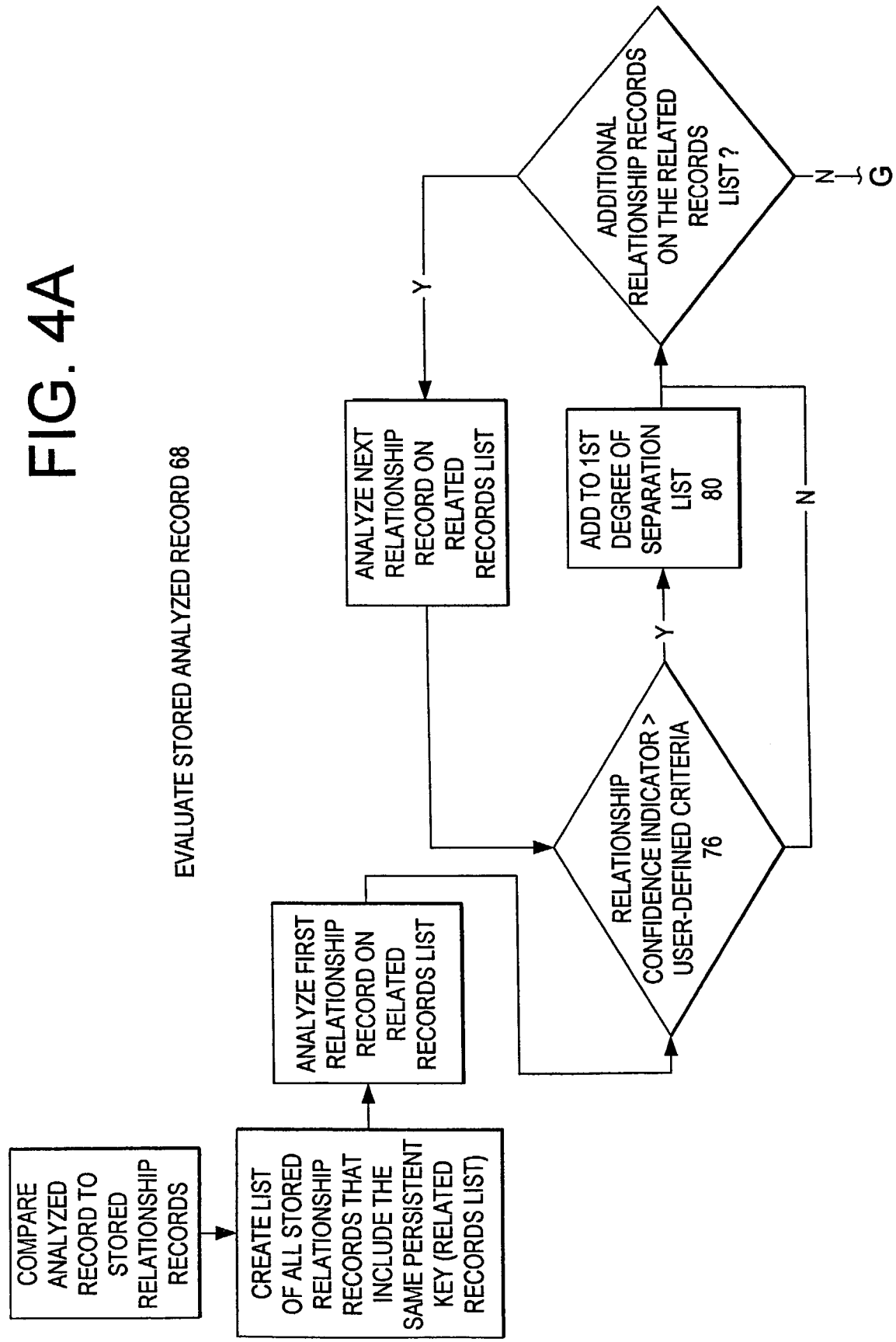

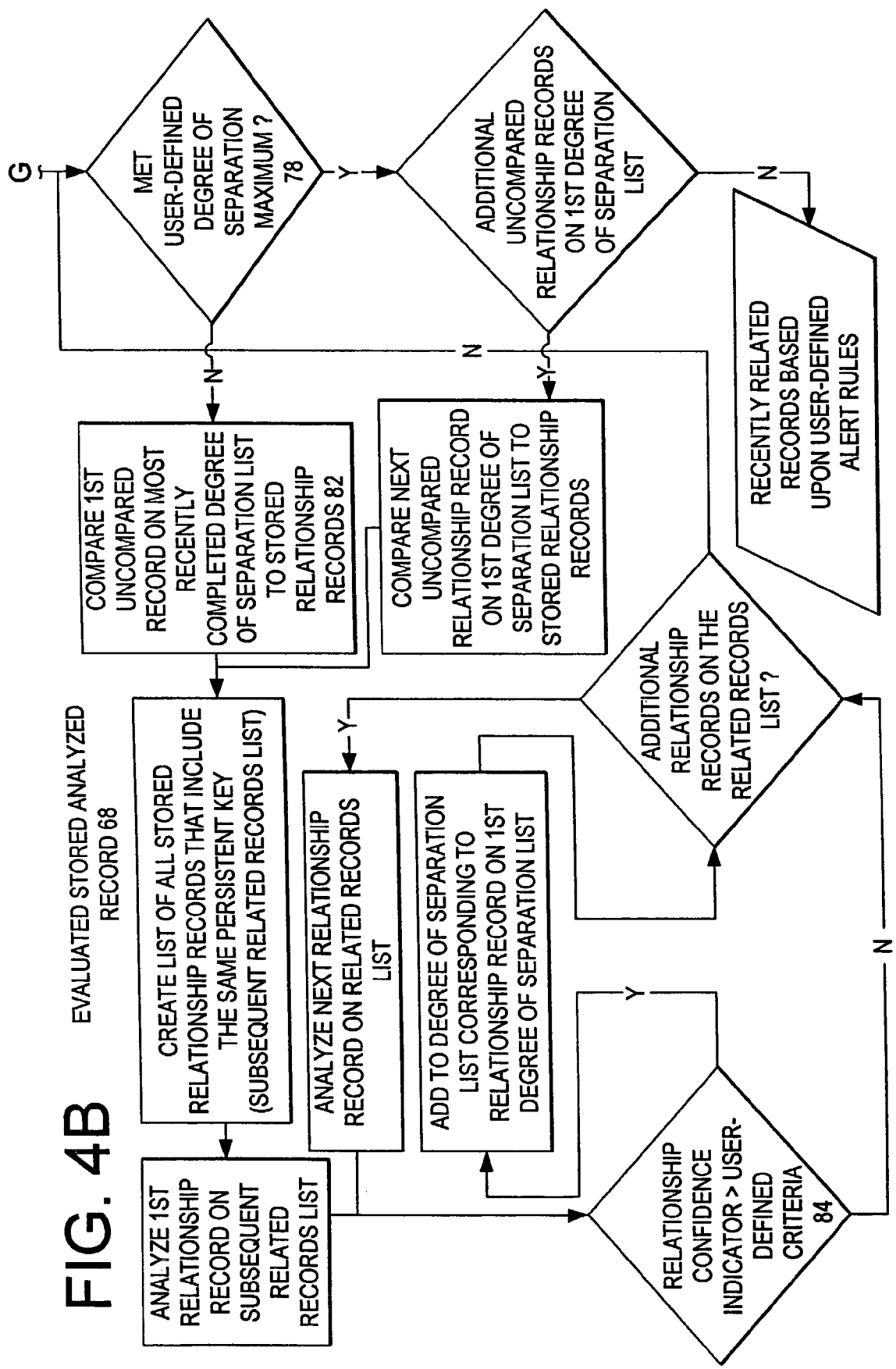

REAL TIME DATA WAREHOUSING

CROSS-REFERENCE TO RELATED APPLICATIONS

The present application claims the benefit of provisional application No. 60/344,067, filed in the United States Patent Office on Dec. 28, 2001.

FEDERALLY SPONSORED OR DEVELOPMENT

Not Applicable.

TECHNICAL FIELD

This invention generally relates to a method, program and system for processing and retrieving data in a data warehouse and, more particularly, to a method, program and system for the processing of data into and in a data warehouse, to the querying of data in a data warehouse, and the analyzing of data in a data warehouse.

BACKGROUND OF THE INVENTION

Data warehouses are computer-based databases designed to store records and respond to queries generally from multiple sources. The records correspond with entities, such as individuals, organizations and property. Each record contains identifiers of the entity, such as for example, a name, address or account information for an individual.

Unfortunately, the effectiveness of current data warehouse systems is diminished because of certain limitations that create, perpetuate and/or increase certain data quality, integrity and performance issues. Such limitations also increase the risk, cost and time required to implement, correct and maintain such systems.

The issues and limitations include, without limitation, the following: (a) challenges associated with differing or conflicting formats emanating from the various sources of data, (b) incomplete data based upon missing information upon receipt, (c) multiple records entered that reflect the same entity based upon (often minor) discrepancies or misspellings, (d) insufficient capability to identify whether multiple records are reflecting the same entity and/or whether there is some relationship between multiple records, (e) lost data when two records determined to reflect the same entity are merged or one record is discarded, (f) insufficient capability to later separate records when merged records are later determined to reflect two separate entities, (g) insufficient capability to issue alerts based upon user-defined alert rules in real-time, (h) inadequate results from queries that utilize different algorithms or conversion processes than the algorithms or conversion processes used to process received data, and (i) inability to maintain a persistent query in accordance with a pre-determined criteria, such as for a certain period of time.

For example, when the identifiers of an individual are received and stored in a database: (a) the records from one source may be available in a comma delimited format while the records of another source may be received in another data format; (b) data from various records may be missing, such as a telephone number, an address or some other identifying information; or (c) two records reflecting the same individual may be unknowingly received because one record corresponds to a current name and another record corresponds to a maiden name. In the latter situation, the system may determine that the two records ought to be merged or that one record (perhaps emanating from a less reliable source) be discarded. However, in the merging process, current systems typically abandon data, which negates the ability to later separate the two records if the records are determined to reflect two separate entities.

Additionally, when the identifiers are received and stored in a database, the computer may perform transformation and enhancement processes prior to loading the data into the database. However, the query tools of current systems use few, if any, of the transformation and enhancement processes used to receive and process the received data, causing any results of such queries to be inconsistent, and therefore inadequate, insufficient and potentially false.

Similarly, current data warehousing systems do not have the necessary tools to fully identify the relationship between entities, or determine whether or not such entities reflect the same entity in real-time. For example, one individual may have the same address of a second individual and the second individual may have the same telephone number of a third individual. In such circumstances, it would be beneficial to determine the likelihood that the first individual had some relationship with the third individual, especially in real-time.

Furthermore, current data warehousing systems have limited ability to identify inappropriate or conflicting relations between entities and provide alerts in real-time based upon user-defined alert rules. Such limited ability is based upon several factors, including, without limitation, the inability to efficiently identify relationships as indicated above.

Furthermore, current data warehousing systems cannot first transform and enhance a record and then maintain a persistent query over a predetermined period. A persistent query would be beneficial in various circumstances, including, without limitation, in cases where the name of a person is identified in a criminal investigation. A query to identify any matches corresponding with the person may initially turn up with no results and the queried data in current systems is essentially discarded. However, it would be beneficial to load the query in the same way as received data wherein the queried data may be used to match against other received data or queries and provide a better basis for results.

As such, any or all the issues and limitations (whether identified herein or not) of current data warehouse systems diminishes accuracy, reliability and timeliness of the data warehouse and dramatically impedes performance. Indeed, the utilization with such issues may cause inadequate results and incorrect decisions based upon such results.

The present invention is provided to address these and other issues.

SUMMARY OF THE INVENTION

It is an object of the invention to provide a method, program and system for processing data into and in a database. The method preferably comprises the steps of: (a) receiving data for a plurality of entities, (b) utilizing an algorithm to process the received data, (c) storing the processed data in the database, (d) receiving data queries for retrieving data stored in the database, and (e) utilizing the same algorithms to process the queries.

The data comprises one or more records having one or more identifiers representing one or more entities. The entities may be individuals, property, organizations, proteins or other things that can be represented by identifying data.

The algorithm includes receiving data that has been converted to a standardized message format and retains attribution of the identifiers, such as a source system, the source system's unique value for the identifier, query system and/or user.

The algorithm process includes analyzing the data prior to storage or query in the database wherein such analyzing step may include: (a) comparing one or more identifiers against a user-defined criterion or one or more data sets in a database, list, or other electronic format, (b) formatting the identifier in accordance with the user-defined standard, (c) enhancing the data prior to storage or query by querying one or more data sets in other databases (which may have the same algorithm as the first database and continue to search in a cascading manner) or lists for additional identifiers to supplement the received data with any additional identifiers, (d) creating hash keys for the identifiers, and (d) storing processed queries based upon user-defined criterion, such as a specified period of time.

It is further contemplated that the method, program and system would include: (a) utilizing an algorithm to process data and match records wherein the algorithm process would: (i) retrieve from the database a group of records including identifiers similar to the identifiers in the received data, (ii) analyze the retrieved group of records for a match to the received data, (iii) match the received data with the retrieved records that are determined to reflect the same entity, (iv) analyze whether any new identifiers were added to any matched record, and (v) re-search the other records of the retrieved group of records to match to any matched record, and (b) storing the matched records in the database. Additionally, the algorithm may include: (a) retrieving from the database an additional group of records including identifiers similar to the identifiers in the matched record, (b) repeating the steps of retrieving records, analyzing for matches, matching same entity records, analyzing new identifiers, and re-searching retrieved records until no additional matches are found, and (c) assigning a persistent key to the records. Such processes could be performed in batch or in real-time.

It is yet further contemplated that the method, program and system includes determining whether a particular identifier is common across entities or generally distinctive to an entity, and separating previously matched records if the particular identifier used to match the records is later determined to be common across entities and not generally distinctive of an entity. Such determining and separating steps may be performed in real-time or in batch. The determining and separating steps may include stopping any additional matches based upon an identifier that is determined to be common across entities and not generally distinctive of an entity, as well as re-processing any separated records.

It is further contemplated that the received data is compared with at least one other previously stored record to determine the existence of a relationship between the entities, and that a relationship record is created for every two entities for which there exists a relationship. The relationship record may include confidence indicator(s), indicating the likelihood of a relationship between the two entities or the likelihood that the two entities are the same. The relationship record may also reference roles of the entities that are included in the received data or assigned. The relationship records are analyzed to determine the existence of any previously unknown related records based upon the existence of a user-defined criterion. The relationship records reflect a first degree of separation which may be analyzed and navigated to include only those records that meet a predetermined criterion, such as a maximum number of degrees of separation test or a minimum level of the relationship and/or likeness confidence indicators. An alert may be issued identifying the group of related records based upon a user-defined alert rule. The alert may be communicated through various electronic communication means, such as an electronic mail message, a telephone call, a personal digital assistant, or a beeper message.

It is further contemplated that the method would include: (a) duplicating the relationship records on one or more databases, (b) distributing received data to one or more of the additional databases for analysis based upon work load criteria; and (c) issuing any alerts from the additional databases.

It is further contemplated that the method and system would include transferring the stored data to another database that uses the same algorithm as the first database. The steps of processing and transferring may be performed in real-time or in batch.

These and other aspects and attributes of the present invention will be discussed with reference to the following drawings and accompanying specification.

BRIEF DESCRIPTION OF THE DRAWINGS

FIG. 1 is a block diagram of a system in accordance with the present invention;

FIG. 2 is a flow chart for process data in the System block in FIG. 1;

FIGS. 3A-3C are a flow chart of the Process Algorithm block in FIG. 2; and

FIGS. 4A-4B are a flow chart of the Evaluate Stored Analyzed Record block in FIGS. 3A-3C.

DETAILED DESCRIPTION OF THE INVENTION

Figure 3A:
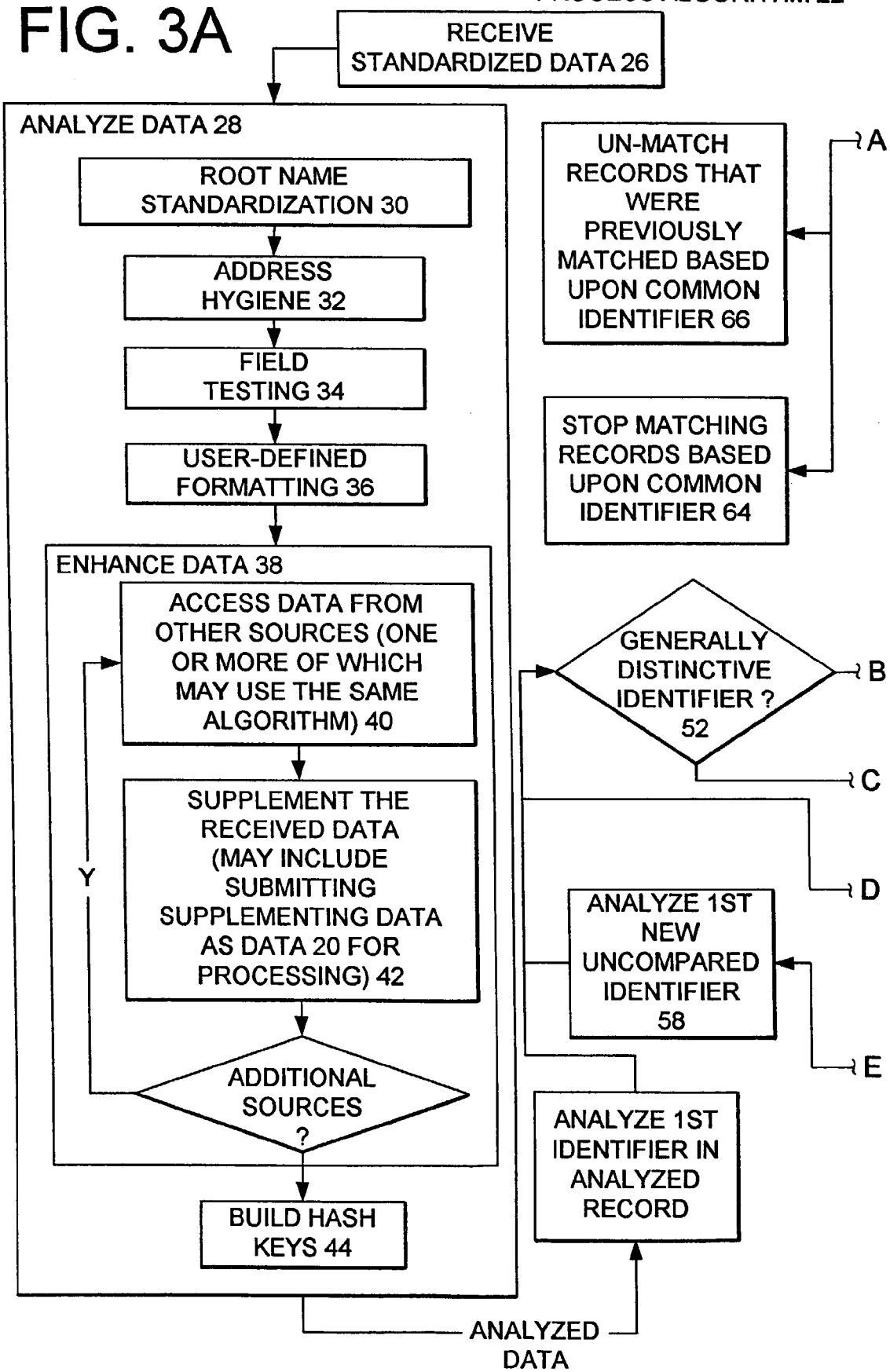

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

A data processing system 10 for processing data into and in a database and for retrieving the processed data is illustrated in FIGS. 1, 2, 3 and 4. The system 10 includes at least one conventional computer 12 having a processor 14 and memory 16. The memory 16 is used for storage of the executable software to operate the system 10 as well as for storage of the data in a database and random access memory. However, the software can be stored or provided on any other computer readable medium, such as a CD, DVD or floppy disc. The computer 12 may receive inputs from a plurality of sources $18_1$-$18_n$.

The data comprises one or more records having one or more identifiers representing one or more entities. The entities may be individuals, organizations, property, proteins, chemical or organic compounds, biometric or atomic structures, or other things that can be represented by identifying data. The identifiers for an individual type entity may include the individual's name, address(es), telephone number(s), credit card number(s), social security number, employment information, frequent flyer or other loyalty program, or account information. Generally distinctive identifiers are those that are distinctive to a specific entity, such as a social security number for an individual entity.

As illustrated in FIG. 2, the system 10 receives the data from the plurality of sources $18_1$-$18_n$ and utilizes an algorithm 22 to process the received data 20. The algorithm is stored in the memory 16 and is processed or implemented by the processor 14.

The received data 20 including, without limitation, attributions of the received data (e.g., source system identification), is likely received in many data formats. Prior to being processed by the algorithm 22, the received data 20 is converted into a standardized message format 24, such as Universal Message Format.

Figure 3C:
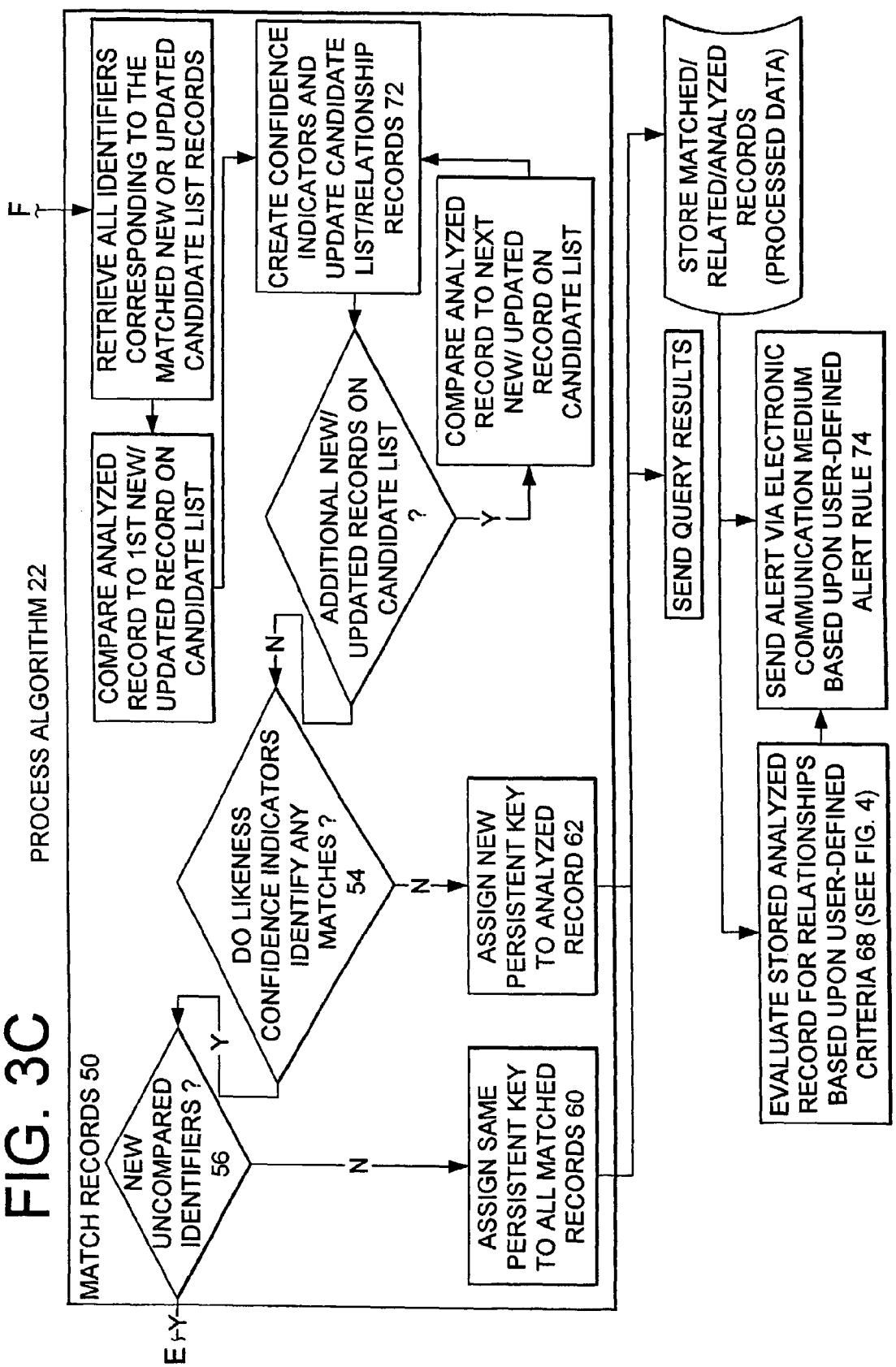

Thereafter, as illustrated in FIG. 3, the algorithm 22 receives the standardized data 26 and analyzes 28 the received data 26 prior to storage or query in the database by: (a) comparing the received data 26 to user-defined criteria or rules to perform several functions, including, without limitation, the following: (i) name standardization 30 (e.g., comparing to a root names list), (ii) address hygiene 32 (e.g., comparing to postal delivery codes), (iii) field testing or transformations 34 (e.g., comparing the gender field to confirm M/F or transforming Male to M, etc.), (iv) user-defined formatting 36 (e.g., formatting all social security numbers in a 999-99-9999 format), (b) enhancing the data 38 by causing the system 10 to access one or more databases 40 (which may contain the same algorithm as the first database, thus causing the system to access additional databases in a cascading manner) to search for additional information (which may be submitted as received data 20) which can supplement 42 the received data 26, and (c) building hash keys of the analyzed data 44. Any new, modified or enhanced data can be stored in newly created fields to maintain the integrity of the original data. For example, if the name "Bobby Smith" is received in a standardized format 26, the name "Bobby" may be compared to a root name list 30, standardized to the name "Robert" and saved in a newly created field for the standard name. Additionally, if the name and address for Bobby Smith is received 26, the system 10 can access a conventional Internet-based people finder database 40 to obtain Bobby Smith's telephone number, which can then be formatted in a standard way based upon user-defined criteria 36. Furthermore, the address field may be compared to an address list 32, resulting in the text "Street" added to the end of the standardized address. Hash keys axe then built 44 based upon the enhanced data and stored in newly created fields.

Referring again to FIG. 2, the system 10 also receives queries 46 from the plurality of sources $18_1$-$18_n$, and utilizes the same algorithm 22 to analyze and process the received queries 46. For example, if a query for "Bobby Smith" is received 46, the same algorithm 22 which standardized the received name "Bobby" to the name "Robert" will also standardize the queried name "Bobby" to the queried name "Robert." Indeed, the system 10 loads and stores received queries 46 the same as received data 20, maintaining the full attribution of the query system and user. As such, as the system 10 processes the received queries 46, the algorithm 22 may search other databases 40, such as a public records database, to find missing information. Query results 94 may be broader than exact matches, and may include relationship matches. For example, if the query is for "Bobby Smith", the query results 94 may include records of people who have used Bobby Smith's credit card, or have lived at Bobby Smith's address.

Referring the algorithm 22 also performs a function upon receipt of any received data 26 to: (a) determine whether there is an existing record in the database that matches the entity corresponding to such received data and (b) if so, matching the received data to the existing record. For example, the algorithm retrieves a group of records 48 (including identifiers similar to the identifiers in the received data) from the database for possible candidates and analyzes the retrieved group of records for a match 50 identifying an existing stored record corresponding to the received data based upon generally distinctive identifiers 52. If a match is identified 54, the algorithm analyzes whether the matched record contains any new or previously unknown identifiers 56. If there were new or previously unknown identifiers 56, the algorithm 22 would analyze the new or previously unknown identifiers 58, add or update the candidate list/relationship records 70 based upon the new or previously unknown identifiers in the matched record, and determine whether any additional matches 50 exist. This process is repeated until no further matches can be discerned. The matching process would then assign all of the matched records the same persistent key 60. Furthermore, if no matches were found for any record, the unmatched record would be assigned its own persistent key 62. The records retain full attribution of the data and the matching process does not lose any data through a merge, purge or delete function.

For example, if record #1 has an individual's name, telephone number and address, and record #2 has the same name and a credit card number. One does not know whether or not they are the same individual, so the records must be kept separate. Then data for record #3 is received, including the individual's name (same as record #1), address (same as record #1), telephone number (same as record #1) and credit card number. Because the name, telephone number and address for #1 and #3 match, the system 10 may determine that #1 and #3 are describing the same individual, so the algorithm matches record #1 with #3 data. The system 10 then re-runs the algorithm, comparing the matched record #1 with the other records of the candidate list or additional records that include identifiers similar to the matched record. Because the name and credit card number of matched record #1 matches the name and credit card number of record #2, these two records are also matched. This matched record is then run again against the candidate list or additional records retrieved looking for matches 54 until no more matches are obtained.

On occasion, the system 10 may determine that two records were incorrectly matched. For example, social security numbers are considered generally distinctive identifiers for individuals, and thus records often are matched based upon the same social security number. However, it is possible that such number, in certain circumstances, is later determined to be common across entities and not generally distinctive of an entity. For example, consider a data entry operation having a record field for social security numbers as a required field, but the data entry operator who did not know the social security number of the individuals merely entered the number "123-45-6789" for each individual.

In such a case, the social security number would be common across such individual type entities and no longer a generally distinctive identifier for these individuals. Accordingly: (a) the now known common identifier would be added to a list of common identifiers and all future processes would not attempt to retrieve records for the candidate list or create relationship records 70 based upon the now known common identifier, thus stopping any future matches 64 and (b) any records that were matched based upon that erroneous social security number would need to be split to reflect the data prior to the match, thus requiring no prior data loss. To accomplish the latter objective, the system 10 separates any matches that occurred based upon the incorrect assumptions 66 to the point prior to the incorrect assumption pursuant to the full attribution of the data, without any loss of data. Thus, if record #1 for "Bobby Smith" (which had been standardized to "Robert Smith") had been matched with record #2 for "Robert Smith", and it is later determined that these are two different individuals, and that they needed to be broken into the original record #'s 1 and 2, the algorithm would identify that the standardized "Robert Smith" of record #1 was known as "Bobby." Furthermore, the determining and separating steps can be performed in real-time or in batch. Furthermore, the separated records may be re-submitted as new received data to be processed in the system.

There are also times when relationships, even less than obvious relationships, need to be evaluated at 68, which is further described in FIG. 4. For example, individuals #1 and #2 may each have a relationship to an organization #3. Thus it is possible, perhaps likely, that there is a relationship between individuals #1 and #2. The relationships can be extended to several degrees of separation. Accordingly, the system 10 compares all received data to all records in the stored data and creates a relationship record 70 for every pair of records for which there is some relationship between the respective entities. The relationship record 70 would include relationship types (e.g., father, co-conspirator), the confidence indicators (which are scores indicating the strength of relationship of the two entities) 72 and the assigned persistent key 60 or 62. For example, the confidence indicators 72 may include a relationship score and a likeness score. The relationship score is an indicator, such as between 1 and 10, representing the likelihood that there is a relationship between individual #1 and individual #2. The likeness score is also an indicator, such as between 1 and 10, that individual #1 is the same person as individual #2. The confidence indicators 72 could be identified during the matching process described hereinabove.

The system 10 also analyzes the received data 20 and queries 46 to determine the existence of a condition that meets the criteria of a user-defined alert rule 74, such as an inappropriate relationship between two entities or a certain pattern of activities based upon relationship records that have a confidence indicator greater than a predetermined value and/or have a relationship record less than a predetermined number of degrees of separation. For example, the system 10 may include a list of fraudulent credit cards that could be used to determine whether any received data or query contains a credit card number that is on the list of fraudulent credit card numbers. Additionally, the user-defined alert rule 74 may cause the received data and queries to be reported. For example, an alert rule may exist if, upon entering data of a new vendor, it was determined that the new vendor had the same address as a current employee, indicating a relationship between the vendor and the employee that perhaps the employer would like to investigate. Upon determination of a situation that would trigger the user-defined alert rule, the system 10 issues an alert 74 which may be communicated through various mediums, such as a message via an e-mail or to a hand-held communication device, such as an alpha-numeric beeper, personal digital assistant or a telephone.

For example, referring to FIG. 4, based upon a user-defined alert rule for all records that have a likelihood of relationship confidence indicator greater than seven 76 to a maximum of six degrees of separation 78, the system 10 will: (a) start with individual #1, (b) find all other individuals 80 related to #1 having a confidence indicator greater than seven 76, (c) analyze all of the first degree of separation individuals 80, and determine all individuals 82 related to the first degree of separation individuals 80 having a confidence indicator greater than seven 84 and (d) repeat the process until it meets the six degrees of separation parameter 78. The system would send electronically an alert 74 (that may include all the resulting records based upon a user-defined criterion) to the relevant individual or separate system enabling further action.

Furthermore, referring the relationship records 70 could be duplicated over several databases. Upon receipt of received data 20, the system could systematically evaluate the nature of the work load of each of the other databases and distribute the matched/related/analyzed records to the database most likely to efficiently analyze the stored analyzed record 68. Any alerts 74 could then be issued from any results emanating from the other databases.

Finally, referring again to FIG. 2, the processed data can be transferred 88 to additional databases based upon a cascading warehouse publication list 86 that may utilize the same algorithm 92, either on a real-time or batch process. In this manner, the transferred data 88 can then be used to match with data (which may include different data) in the additional databases and any subsequent database to identify relationships, matches or processing of such data. For example, the matched records based upon the confidence indicators in a local database may be transferred S8 to the regional database to be compared and matched with data utilizing the same algorithm 92. Thereafter, the processed data resulting from the regional database may be transferred 88 to the national office. By combining the processed data in each step, especially in real-time, organizations or system users would be able to determine inappropriate or conflicting data prompting further action.

Conventional software code can be used to implement the functional aspects of the method, program and system described above. The code can be placed on any computer readable medium for use by a single computer or a distributed network of computers, such as the Internet.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method for separating previously matched records, the method comprising the steps of:
   determining whether a particular identifier in at least one record representing at least one entity is: (1) common across records representing at least two different entities and (2) no longer generally distinctive of a record representing a single entity;
   separating records that were previously matched based on the particular identifier, when the particular identifier is determined to be: (1) common across records representing at least two different entities and (2) no longer generally distinctive of a record representing a single entity;
   storing the separated records;
   adding the particular identifier to a list of common identifiers, when the particular identifier is determined to be: (1) common across records representing at least two different entities and (2) no longer generally distinctive of a record representing a single entity; and
   prohibiting any additional matches of records based on the particular identifier when the particular identifier is determined to be (1) common across records representing at least two different entities and (2) no longer generally distinctive of a record representing a single entity.

2. The method of claim 1 further comprising the step of re-submitting the separated records as new received data to be processed.

3. The method of claim 1 wherein the steps of determining whether a particular identifier in at least one record representing at least one entity is (1) common across records representing at least two different entities and (2) no longer generally distinctive of a record representing a single entity and separating records that were previously matched are performed in real-time.

4. The method of claim 1 wherein the steps of determining whether a particular identifier in at least one record representing at least one entity is (1) common across records representing at least two different entities and (2) no longer generally distinctive of a record representing a single entity and separating records that were previously matched are performed in batch.

5. A computer readable medium containing program instructions for execution by a computer for performing a method for separating previously matched records, the method comprising the steps of:

determining whether a particular identifier in at least one record representing at least one entity is: (1) common across records representing at least two different entities and (2) no longer generally distinctive of a record representing a single entity; and separating records that were previously matched based on the particular identifier when the particular identifier is determined to be: (1) common across records representing at least two different entities and (2) no longer generally distinctive of a record representing a single entity;

storing the separated records;

adding the particular identifier to a list of common identifiers, when the particular identifier is determined to be: (1) common across records representing at least two different entities and (2) no longer generally distinctive of a record representing a single entity; and prohibiting any additional matches of records based on a particular identifier when the particular identifier is determined to be (1) common across records representing at least two different entities and (2) no longer generally distinctive of a record representing a single entity.

6. The computer readable medium of claim 5 further comprising the step of re-submitting the separated records as new received data to be processed by the system.

7. The computer readable medium of claim 5 wherein the steps of determining whether a particular identifier in at least one record representing at least one entity is (1) common across records representing at least two different entities and (2) no longer generally distinctive of a record representing a single entity and separating records that were previously matched are performed in real-time.

8. The computer readable medium of claim 5 wherein the steps of determining whether a particular identifier in at least one record representing at least one entity is (1) common across records representing at least two different entities and (2) no longer generally distinctive of a record representing a single entity and separating records that were previously matched are performed in batch.

9. An apparatus for separating previously matched records, comprising:

one or more computers; and one or more processes performed by the one or more computers, the processes configured for:

determining whether a particular identifier in at least one record representing at least one entity is: (1) common across records representing at least two different entities and (2) no longer generally distinctive of a record representing a single entity;

separating records that were previously matched based on the particular identifier, when the particular identifier is determined to be: (1) common across records representing at least two different entities and (2) no longer generally distinctive of a record representing a single entity;

storing the separated records;

adding the particular identifier to a list of common identifiers, when the particular identifier is determined to be: (1) common across records representing at least two different entities and (2) no longer generally distinctive of a record representing a single entity; and prohibiting any additional matches of records based on the particular identifier when the particular identifier is determined to be (1) common across records representing at least two different entities and (2) no longer generally distinctive of a record representing a single entity.

10. The system of claim 9 wherein the processes are further configured for re-submitting the separated records as new received data to be processed.

11. The system of claim 9 wherein the processes configured for determining whether a particular identifier in at least one record representing at least one entity is (1) common across records representing at least two different entities and (2) no longer generally distinctive of a record representing a single entity and separating records that were previously matched are performed in real-time.

12. The system of claim 9 wherein the processes configured for determining whether a particular identifier in at least one record representing at least one entity is (1) common across records representing at least two different entities and (2) no longer generally distinctive of a record representing a single entity and separating records that were previously matched are performed in batch.

\* \* \* \* \*